(12) United States Patent
Morselli

(10) Patent No.: US 9,404,366 B2
(45) Date of Patent: Aug. 2, 2016

(54) GEAR WHEEL WITH PROFILE CAPABLE OF MESHING WITH SEMI-ENCAPSULATION IN A GEARED HYDRAULIC APPARATUS

(71) Applicants: Settima Meccanica S.r.l., Gossolengo (Placenza) (IT); Mario Antonio Morselli, Modena (IT)

(72) Inventor: Mario Antonio Morselli, Modena (IT)

(73) Assignees: Settima Meccanica S.r.l. (IT); Mario Antonio Morselli (IT)

( * ) Notice: Subject to any disclaimer, the term of this patent is extended or adjusted under 35 U.S.C. 154(b) by 0 days.

(21) Appl. No.: 14/287,527

(22) Filed: May 27, 2014

(65) Prior Publication Data

US 2014/0271314 A1 Sep. 18, 2014

Related U.S. Application Data

(63) Continuation-in-part of application No. 12/914,780, filed on Oct. 28, 2010, now abandoned.

(30) Foreign Application Priority Data

Oct. 30, 2009 (IT) ................ BO2009A0714

(51) Int. Cl.
*F01C 1/08* (2006.01)
*F04C 2/08* (2006.01)
*F16H 55/08* (2006.01)
*F04C 2/14* (2006.01)

(52) U.S. Cl.
CPC ............. *F01C 1/084* (2013.01); *F04C 2/084* (2013.01); *F04C 2/14* (2013.01); *F16H 55/08* (2013.01); *Y10T 74/1987* (2015.01)

(58) Field of Classification Search
CPC .................. F04C 2/084; F04C 2/14
USPC ............. 418/206.5, 206.1; 74/434; 417/366
See application file for complete search history.

(56) References Cited

U.S. PATENT DOCUMENTS 2,159,744 A    5/1939   Maglott
3,164,099 A    1/1965   Iyoi
(Continued)

FOREIGN PATENT DOCUMENTS

EP    0769104 B1   9/1999
EP    1371848 B1   1/2006
(Continued)

OTHER PUBLICATIONS

Internet article entitled "Module for Cubic Splines" by John H. Mathews, 2004. Internet location: math.fullerton.edu/mathews/n2003/cubicSplinesMod.html.*
(Continued)

*Primary Examiner* — Kenneth Bomberg
*Assistant Examiner* — Paul Thiede
(74) *Attorney, Agent, or Firm* — Akerman LLP

(57) ABSTRACT

A gear wheel comprising a plurality of helical teeth, each helical tooth of the gear wheel having a tooth profile meshing with semi-encapsulation in a geared hydraulic apparatus. Each tooth having a profile which falls within a band of tolerance of $+-\frac{1}{15}$ of the depth of a nominal tooth defined by a spline function interpolating a plurality of node points having pre-established coordinates {X,Y} with their origin on the gear wheel center.

13 Claims, 4 Drawing Sheets indicated value in millimeter

(56) References Cited

U.S. PATENT DOCUMENTS

| 3,209,611 | A | 10/1965 | Iyoi | |
|---|---|---|---|---|
| 6,769,891 | B2* | 8/2004 | Morselli | 418/206.5 |
| 2010/0104463 | A1* | 4/2010 | Morselli | 418/201.1 |
| 2011/0103993 | A1* | 5/2011 | Morselli | 418/206.1 |

FOREIGN PATENT DOCUMENTS

| EP | 1132618 B1 | 4/2008 |
|---|---|---|
| WO | 2008/111017 A1 | 9/2008 |

OTHER PUBLICATIONS

Morselli, "Mechanical and Hydraulic Noise of Gear Pumps, The Drastic Evolution Marked by "Continuous Contact" Pumps", Oleodinamica Pneumatica, Jan. 2005.

Meneghello, "The Practice of Geometric Model Reconstruction from Experimental Data Points", Technical Report.

Internet Article entitled "Module for Cubic Splines" by John H. Matthews. Internet Location: math.fullerton.edu/matthews/n2003/CubicSplinesMod.html.

\* cited by examiner

GEAR WHEEL WITH PROFILE CAPABLE OF MESHING WITH SEMI-ENCAPSULATION IN A GEARED HYDRAULIC APPARATUS

CROSS-REFERENCE TO RELATED APPLICATIONS

This application is a continuation-in-part of U.S. patent application Ser. No. 12/914,780, filed Oct. 28, 2010, which claims priority to Italian Patent Application No. BO2009A000714, filed Oct. 30, 2009, the entirety of which are incorporated herein by reference.

BACKGROUND OF THE INVENTION

The present invention refers to a gear wheel, of the type having a profile capable of meshing with semi-encapsulation in a geared hydraulic apparatus.

Typical examples of geared hydraulic apparatus in which the gear wheels of the present invention, and to which specific reference shall be made hereinafter, find application are rotary positive displacement pumps, but the gear wheels of the present invention may also analogously be applied to hydraulic geared motors, which are thus deemed included within the scope of protection of the present invention. Rotary positive displacement pumps are generally made up of two gear wheels, in most cases of the straight cut gears, one of which, called driver, is connected to a driving shaft and rotates the other wheel, called driven.

A disadvantage particularly revealed by the abovementioned conventional gear pumps, generally with involute gear profile, lies in the fact that the pumped fluid is encapsulated, i.e. trapped, and compressed or however subjected to volume variations in the compartments enclosed between the gear profiles in the meshing area, thus leading to damaging and uncontrolled local stress peaks which are the source of direct operating noise.

Besides the direct operating noise indicated above, there is also a known problem arising from the phenomenon of irregularity, or "ripple", in the transfer of the fluid which entails an indirect operating noise, known as ripple noise, linked to the flow rate pulsation and therefore pressure pulsation in the user circuit.

In other words, the oscillations in the fluid flow rate generate a pulsating wave which, via the fluid itself, is transmitted to the surrounding environment and, in particular, to the walls of the pump, to the piping and to the delivery pipes.

The induced noise may also reach unpredictable levels in the case where the aforesaid parts resonate with the oscillation or ripple frequency.

PRIOR ART

A series of studies and experiments have shown that such oscillations are intrinsically due to the configuration of the rotors or gear wheels of the abovementioned pumps which, in consecutive phases of the meshing thereof, produce a discontinuity in the variation of the volume which causes the transport of the fluid from intake to delivery.

In other words, the ripple is due to the discontinuity in the variation of said volume with respect to time, or, rather, with respect to the reciprocal angular position of the rotors.

The aforesaid phenomena are clearly and fully described in the articles by MORSELLI Mario Antonio, "*Mechanical and hydraulic noise in geared pumps*", Oleodinamica Pneumatica, January 2005, pp. 54-59, and February 2005, pp. 42-46, which also appeared in *Fluides & Transmissions*, No. 75, April 2005, pp. 34-37 and No. 77, May 2005, pp. 20-26.

Some solutions which have addressed, with greater or lesser success, the problems illustrated above are known.

Some of these solutions regard pumps with conventional teeth, having tooth side profiles, mostly, but not necessarily, that are involute, of the straight cut gear type or, more rarely, helical gear type, with clearance (that is, with single contact of a tooth of one gear wheel with a corresponding tooth of the other gear wheel} or theoretically without clearance (that is, with double contact, where both the sides of the teeth are theoretically always in engagement, as in the pump from Bosch Rexroth AG known by the trade name SILENCE, or the pump from Casappa S.p.A. known by the trade name WHISPER).

In these solutions, the fluid trapped between the teeth is, at least in part, "discharged", that is, evacuated, via suitable outlets or pockets or ducts provided on the faces of the lateral abutment means, otherwise known as supports or bushes, of the gear wheels, that is, on the walls which face the flat lateral gear wheel ends, and which make it possible to discharge (or suction) the encapsulated volume of fluid towards the appropriate, respectively high or low pressure, port or gate.

The provision of the pockets on the faces of the lateral abutment means, however, becomes much more complex when it is wished to produce helical gear wheels in order to reduce the problem of ripple noise.

Moreover, the use of helical gear wheels in itself presents a series of additional problems, since in this case the volume of each fluid entrapment area also extends, like the teeth of the gear wheels, on a worm-like helical course over the entire width of the gear wheel, therefore representing a potential communication route or by-pass between the intake and delivery, if particular solutions are not adopted.

In practice, either small helix angles of the gear wheels are used, or one is forced to use solutions that are very complex and expensive from the constructional point of view, such as that described in the document EP-0769104 of Brown David Hydraulics Ltd., in which the gear wheels have, for each of the cross-sections thereof, at least two teeth simultaneously in engagement.

Such solutions, however, are very complex and substantially not very efficient, since they are developed on the basis of concepts that are closer to mathematical abstractions than to practical and technologically feasible possibilities; in practice, the geometry of said pockets is always a not entirely satisfactory compromise.

In any case, all the known pump solutions, whether of the straight cut or helical gear type, single or double contact, which employ discharge pockets on the lateral abutment means have however a residual trapped volume which is subject to variations which cannot be discharged, and which therefore generate a certain residual noise, besides having a significant and damaging ripple.

Other known solutions to the problems of direct and indirect noise mentioned above relate to pumps with teeth having a non-conventional profile, which may be defined as of the "continuous contact" type, which do not trap fluid between the head and bottom of the tooth. In practice, the gear wheels meshing with one another have profiles having a rounded form at the head of the tooth and a theoretical single point of contact which moves continuously from one side of the gear wheel to the other, so as not to generate any closed area of fluid entrapment during meshing, over the entire width of the gear wheels.

This principle, theoretically stated in broad terms and quite generally in the documents U.S. Pat. No. 2,159,744, U.S. Pat.

No. 3,164,099, U.S. Pat. No. 3,209,611 which has, however, never found any practical application, has been fully developed and described in the documents EP-A-1132618, EP-B-1371848, U.S. Pat. No. 6,769,891 of the same inventor and joint Applicant of the present application, as well as in the technical articles mentioned above, and has found a practical application in the pump known by the trade name Continuum® by Settima Flow Mechanisms.

The teeth types developed in the above mentioned documents by the inventor do not have a by-pass between intake and delivery of the pump, they have minimum pulsation of the fluid and a notable quietness of meshing.

This last solution, although it has proved to be clearly superior from the point of view of quietness compared with conventional pumps, has however the drawback of a slightly lower displacement performance with respect to that of the known pump solutions in which there is fluid entrapment.

The main reason lies in the low tooth depth that can be produced with a profile designed according to the concept of "non-encapsulation", and therefore a corresponding low efficient flow rate per unit of volume, considering the same number of teeth. In order to have efficient unitary flow rates, comparable with those of the pumps with encapsulation, the inventor, contrary to the traditional literature, identified an ideal range between 5 and 10 teeth, preferably 7 teeth, such number of teeth being low, but entailing greater volumetric losses due to the lower sealing between high pressure delivery and low pressure intake, since the teeth also function as labyrinth seals.

All the problems discussed above are increased in the case of hydraulic apparatuses intended to operate with high pressure differentials, for example in the case of geared pumps for pressure differentials greater than a few tens of bars, and even more for pressures greater than 80-100 bars.

International patent application WO 2008/111017 of the same inventor, whose contents are deemed integrally incorporated herein for reference, refers to an improved geared hydraulic apparatus, comprising a pair of meshing gearwheels, mounted reciprocally rotatable in a casing, said casing having an inlet and an outlet for the passage of a fluid which flows in a direction transverse to the axes of rotation of the gearwheels, the meshing gearwheels assuming, during their reciprocal rotation, different meshing configurations, wherein in at least one of said meshing configurations, a closed fluid entrapment area between two meshing teeth of the meshing gearwheels is formed, said closed fluid entrapment area being entirely cancelled out in one of the progressive meshing configurations, so that an absence of clearance between a tooth head of one gearwheel and a tooth bottom of the other gearwheel is achieved.

In summary, the behavior of the gear wheels according to the patent application WO 2008/111017 of the same inventor is such that an area for the entrapment or encapsulation of the fluid which gradually, during the rotational movement of the wheels, is reduced up to being substantially cancelled when the head of a tooth of a gear wheel touches the bottom of a tooth of another wheel, is formed between the teeth of the two wheels which mesh. Such behavior of the fluid, in the present description, will be named "semi-encapsulation".

SUMMARY OF THE INVENTION

It is an object of the present invention is to provide a gear wheel for a hydraulic apparatus, comprising a plurality of helical teeth presenting a teeth profiles which may be simultaneously efficient for reducing the noise of the pump and at the same time guarantee the possibility of a relatively easy construction.

A further object is to provide a gear wheel which may contribute to reducing the costs of producing a hydraulic apparatus such as positive displacement pumps which apply the principle of "semi-encapsulation".

Still another object is to provide a gear wheel of high reliability of use, which makes it particularly advantageous in case of use for positive displacement pumps working at high pressures, i.e. 80-100 bar or more.

Yet another object is to provide a geared hydraulic apparatus comprising meshing gear wheels of the above kind obtaining a considerably improved performance over the prior art hydraulic apparatuses.

The above objects have been attained by a gear wheel for a hydraulic apparatus according to claim 1 and by a geared hydraulic apparatus according to claim 12 of the present invention.

In particular, the profile of the teeth of the gear wheel of the present invention fall within a band of tolerance delimited by a top profile and a bottom profile, the top and bottom profiles being equally distant from a nominal tooth profile lying along a central line of the band of tolerance, wherein the nominal tooth profile corresponds to a spline function interpolating a plurality of nodal points having pre-established coordinates $\{X,Y\}$ expressed in a system of Cartesian coordinates having origin (O) on the gear wheel center. The distance from the nominal tooth profile being equal to $\frac{1}{15}$ of the depth of the nominal tooth profile obtained with the spline function.

The plurality of nodal points derive from experimental measures.

Preferably the distance from the nominal tooth profile is $\frac{1}{20}$ of the depth of the nominal tooth profile obtained with the spline function, more preferably $\frac{1}{30}$.

The nodal points are defined by a pair of values $\{X, Y\}$ expressed in a system of Cartesian coordinates listed in the appended tables 1-4, for a gear wheel with a number of teeth selected from the group consisting of seven, eight, nine and ten teeth, respectively.

Though it is clear from the description that follows, it is specified that the origin of the system of coordinates X,Y is the rotational axis of the wheel in a plane perpendicular to the rotational axis, which is coincident with the center of the pitch circle of the gear wheel itself.

In the present description, the term "spline function" refers to any spline function which does not introduce errors, or a smoothing spline with a smoothing parameter sufficiently small not to introduce considerable errors with respect to the nodal points.

Preferably, the nodal point should be interpolated by a cubic natural spline function, i.e. an interpolation natural spline function of order three.

Though the natural spline allows some theoretical advantages, the choice of the type of spline is not however binding, in that, depending on the case and for example on the format of the data required by the tooling machines, a man skilled in the art may find it more convenient to use different spline functions or even smoothing splines, also due to the fact that some of these spline functions are commonly available and used in CAD and CAD-CAM systems.

The gear wheels are helical, and preferably the transverse contact ratio (the ratio of the angle of action to the angular pitch) of the helical teeth is comprised between 0.4 and 1.2, more preferably between 0.5 and 1.2, even more preferably between 0.6 and 1.2, yet more preferably between 0.7 and 1.1, more preferably between 0.8 and 1.1, and even more preferably between 0.9 and 1. In a preferred non-limiting embodiment of the present invention, the transverse contact ratio of the helical teeth is substantially one.

Advantageously, a gear wheel according to the present invention has a ratio between face width and pitch circle comprised between 0.5 and 2, preferably between 0.6 and 1.8, more preferably between 0.65 and 1.5, and even more preferably between 0.7 and 1.25.

In a preferred non-limiting embodiment of the present invention, the ratio between face width and pitch circle is substantially one.

The present invention also has the object of a geared hydraulic apparatus comprising a pair of meshing gear wheels having teeth profile of the previously described type. In particular, such hydraulic apparatus may be a hydraulic pump or a hydraulic motor.

Further characteristics of the invention shall be clear from the description that follows of a preferred embodiment, that the gear wheel for a hydraulic apparatus according to the present invention is different from any gear wheel of the prior art.

DETAILED DESCRIPTION OF THE PREFERRED EMBODIMENTS

Though the description that follows was provided with reference to a pump, the same arguments and considerations may apply to analogous hydraulic motors.

Figure 5:
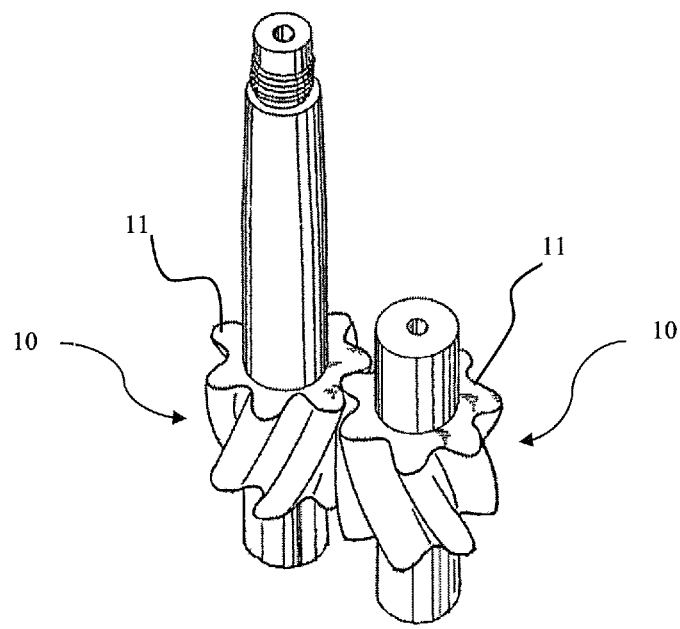
FIG. 5 shows in perspective a pair of meshing gear wheels of a geared hydraulic apparatus, such as hydraulic pump or hydraulic motor, according to the present invention.

FIG. 5 shows a pair of meshing gear wheels 10 of a geared hydraulic apparatus such as a rotary positive displacement pump, preferably of the type for high operating pressures, where the pressure differential between intake and delivery are greater than a few tens of bars, more particularly greater than about 50 bars, and even more particularly greater than about 80-100 bar or more.

Each gear wheel 10 comprises a seven teeth 11 with a teeth profile configured for meshing with semi-encapsulation with another corresponding gear wheel.

The profile of the teeth 11 falls within a band of tolerance delimited by a top profile and a bottom profile, the top and bottom profiles are equally distant from a nominal tooth profile lying along a central line of the band of tolerance, said nominal tooth profile corresponding to a spline function interpolating a plurality of nodal points having pre-established coordinates $\{X,Y\}$ expressed in a system of Cartesian coordinates having origin (O) on the gear wheel center.

The spline function interpolating the plurality of nodal points forming the nominal tooth profile shows the following geometric-functional characteristics:

it does not interpolate passing through each of the nodal points. Instead, it best fit the nodal points passing very near to them; and it is continuous and smooth, as required in gear pumps manufacturing.

The nominal tooth profile may be defined by a cubic natural spline function (even though it is possible to use other spline functions or smoothing spline) interpolating the nodal points defined by the pair of values expressed in the system of Cartesian coordinates having origin in the center of the pitch circle of the gear wheel 10.

Figure 4:
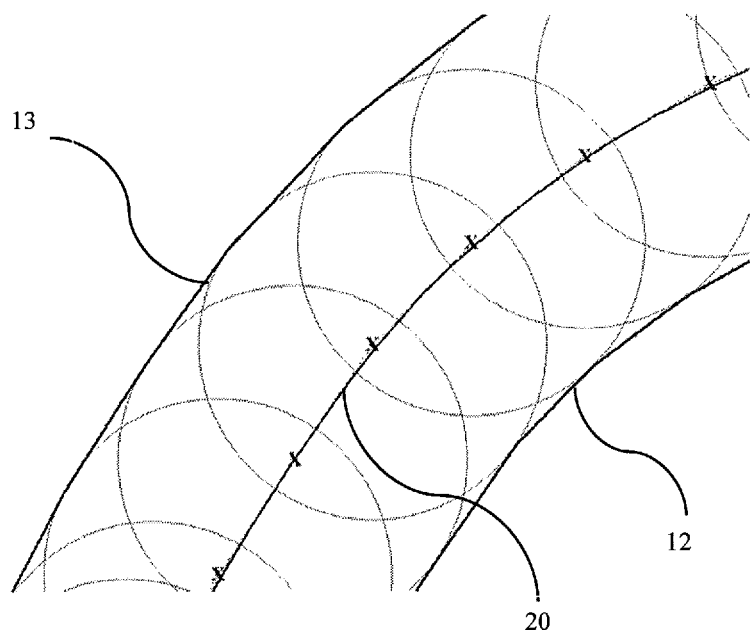
FIG. 4 shows an enlargement view of a cubic natural spline function interpolating same of the nodal points of FIG. 1.

FIG. 4 shows a cubic natural spline function 20 interpolating the given nodal point for a portion of the tooth profile.

As can be seen the spline function interpolate the nodal point with a continuous and smooth line.

In any case, the profile of the teeth of the gear wheel according to the invention shall be conjugated, if not exactly from an analytical point of view, at least from a practical point of view, and i.e. the profile must be capable of meshing correctly in the actual use in a hydraulic apparatus.

In this regard, it is worth pointing out that even in the prior art conventional "involute" gear wheels are not obtained according to a "pure" involute geometry, but with a few variations with respect thereto, leading to variously named profiles, such a "K" profile, tip relief, etc.

Experimentations performed by the applicants led to identifying a series of nominal teeth profiles suitable for providing gear wheels with seven, eight, nine or ten teeth respectively. The actual profile of the teeth 11 falls within the top and bottom profiles delimiting the band of tolerance, wherein the distance of the top and bottom profiles from the nominal tooth profile is equal to $1/15$ of the depth of the nominal tooth profile obtained with the spline function, more preferably said distance is equal to $1/20$ of the depth of the nominal tooth profile obtained with the spline function, and even more preferably said distance is equal to $1/30$ of the depth of the nominal tooth profile obtained with the spline function.

In other words, the top and bottom profiles delimiting the band of tolerance are parallel to the nominal tooth profile obtained with the spline function.

The band of tolerance can be obtained by forming a plurality of circles having the radius equal to $1/15$ ($1/20$; $1/30$) of the depth of the nominal tooth profile and the center in each nodal point.

Figure 1:
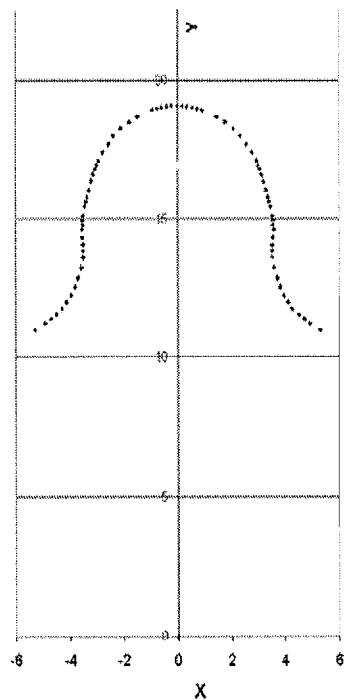
FIG. 1 shows coordinates of nodal points of a gear tooth in a system of Cartesian coordinates having origin in the center of the pitch circle of a gear wheel of seven teeth according to the present invention.
Figure 2:
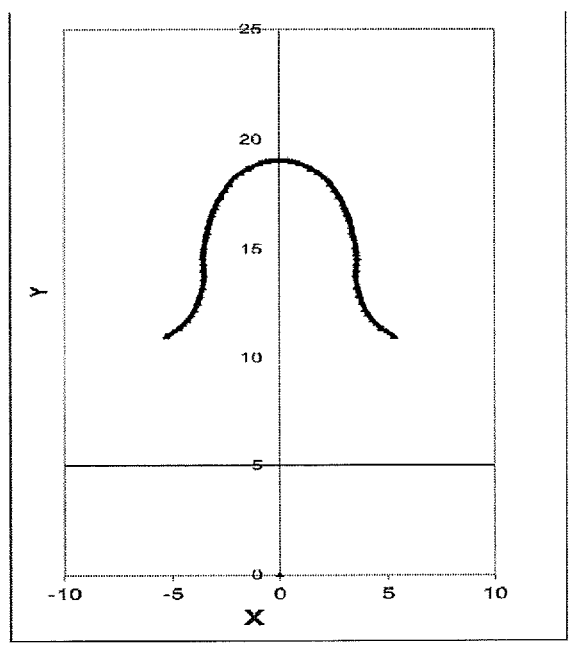
FIG. 2 shows a nominal tooth profile obtained with a spline function interpolating the plurality of nodal points of FIG. 1.
Figure 3:
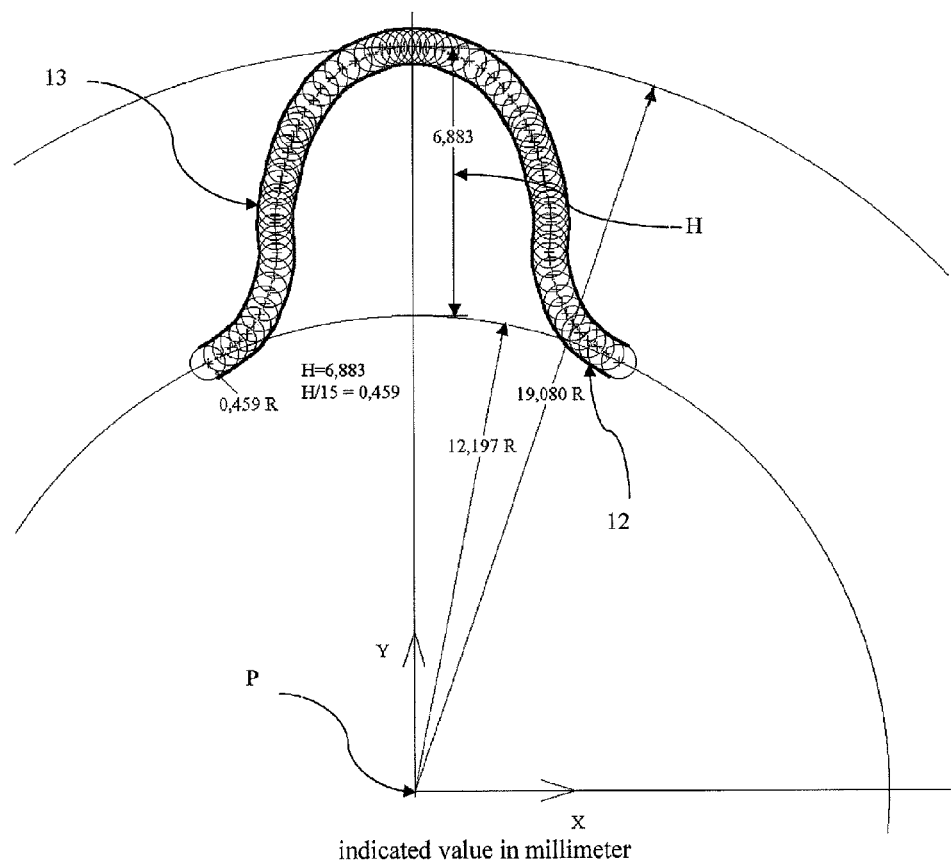
FIG. 3 shows the nominal tooth profile of FIG. 2 with a band of tolerance delimited by a top profile and a bottom profile parallel to the nominal tooth profile at a distance of $1/15$ of the depth of the nominal tooth profile.

In this case the top and bottom profiles are tangential to the plurality of circles as shown in FIG. 3.

FIG. 3 shows the band of tolerance equal to $1/15$ of the depth H of the nominal tooth profile obtained with the spline function 20. The bottom line 12 and the top line 13 delimit the band of tolerance.

Gear wheels with a tooth profile according to the present invention will keep noise to a minimum as well as guarantee higher efficiency.

Figure 6:
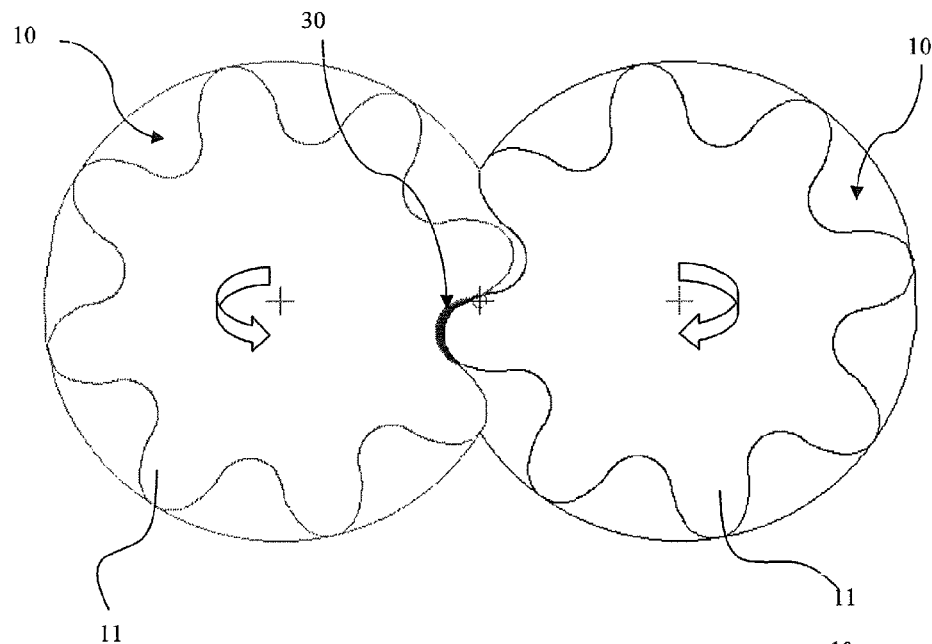
FIG. 6 is a cross-section taken along a plane perpendicular to a rotation axes of the meshing gear wheels of FIG. 5, in a meshing configuration showing a closed fluid entrapment area.

In gear wheels with a tooth profile according to the present invention, the encapsulation is formed as shown in FIG. 6, and gear wheels with such a tooth profile presents a greatly improved level of efficiency.

In particular, the gear wheel of the present invention comprises a plurality of helical teeth having a tooth profile meshing with semi-encapsulation in a geared hydraulic apparatus.

A full explanation of semi-encapsulation can be found in U.S. Pat. No. 8,556,609 which is hereby incorporated by reference.

Figure 7:
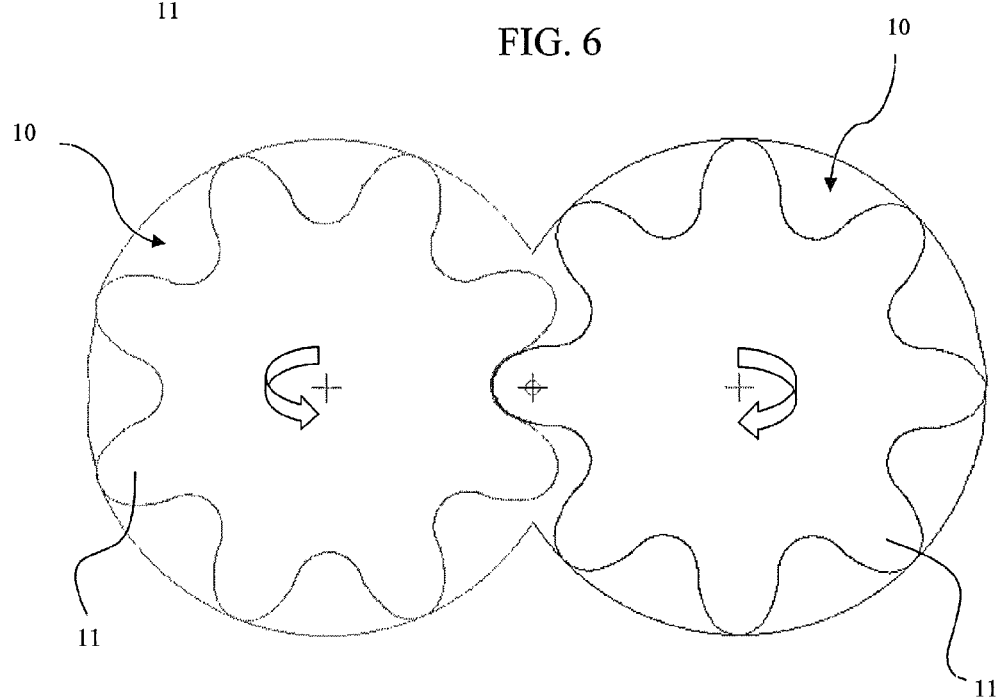
FIG. 7 is a cross-section similar to that of FIG. 6 but in a different meshing configuration showing the closed fluid entrapment area being entirely cancelled out.

In particular, the geared hydraulic apparatus comprising a pair of meshing gear wheels according to the invention present, during the reciprocal rotation of the meshing gear wheels, different meshing configurations, wherein in at least one of said meshing configurations, a closed fluid entrapment area 30 between two meshing teeth of the meshing gearwheels is formed (FIG. 6), said closed fluid entrapment area being entirely cancelled out in one of a progressive meshing configurations (FIG. 7), so that in the latter meshing configuration an absence of any area entrapping fluid between a tooth head of one gearwheel and a tooth bottom of the other gearwheel is achieved.

Differently, gear wheels according to the prior art document U.S. Pat. No. 6,769,891 (Morselli '891) meshes without encapsulation. The tooth profile according to Morselli '891 has a much lower height than a tooth profile for a gear wheel of the same number of teeth designed according to the present invention. Therefore, in order to obtain a good flow rate, gear wheels with a lower number of teeth should be used, if designed according to Morselli '891. But a low number of teeth means low efficiency.

Following are some examples regarding gear wheels of the present invention having a different number of teeth.

Example 1

A gear wheel having a number of teeth equal to seven has a nominal tooth profile corresponding to a cubic natural spline function (which may be replaced by another spline function or smoothing spline if required) interpolating a plurality of nodal points defined by a pair of values $\{X,Y\}$ expressed in a system of Cartesian coordinates having origin (O) in the center of the pitch circle of the gear wheel. The coordinates of the nodal points of the left portion of a gear tooth are listed in the following table 1. The coordinates of the right portion are the same but in reverse order since the silhouette of the right portion—the remaining half of the tooth—is identically symmetrical to the silhouette of the given left portion of the tooth.

TABLE 1

| X | Y |
| --- | --- |
| −5.29 | 10.99 |
| −4.94 | 11.21 |
| −4.71 | 11.37 |
| −4.49 | 11.54 |
| −4.28 | 11.74 |
| −4.10 | 11.98 |
| −3.94 | 12.24 |
| −3.81 | 12.53 |
| −3.69 | 12.86 |
| −3.58 | 13.25 |
| −3.52 | 13.62 |
| −3.51 | 13.84 |
| −3.52 | 14.06 |
| −3.55 | 14.35 |
| −3.56 | 14.61 |
| −3.55 | 14.78 |
| −3.54 | 14.95 |
| −3.51 | 15.12 |
| −3.44 | 15.46 |
| −3.40 | 15.63 |
| −3.36 | 15.79 |
| −3.30 | 16.04 |
| −3.21 | 16.38 |
| −3.13 | 16.62 |

TABLE 1-continued

| X | Y |
| --- | --- |
| −3.06 | 16.79 |
| −3.00 | 16.94 |
| −2.93 | 17.09 |
| −2.76 | 17.41 |
| −2.56 | 17.71 |
| −2.35 | 18.01 |
| −2.09 | 18.28 |
| −1.79 | 18.51 |
| −1.46 | 18.70 |
| −0.93 | 18.92 |
| −0.75 | 18.98 |
| −0.57 | 19.03 |
| −0.38 | 19.06 |
| −0.19 | 19.07 |
| 0.00 | 19.08 |

Example 2

A gear wheel having a number of teeth equal to eight has a nominal tooth profile corresponding to a cubic natural spline function (which may be replaced by another spline function or smoothing spline if required) interpolating a plurality of nodal points defined by a pair of values $\{X,Y\}$ expressed in a system of Cartesian coordinates having origin (O) in the center of the pitch circle P of the gear wheel. The coordinates of the nodal points of the right portion of a gear tooth are listed in the following table 2. The coordinates of the left portion are the same but in reverse order since the silhouette of the left portion—the remaining half of the tooth—is identically symmetrical to the silhouette of the given right portion of the tooth.

TABLE 2

| X | Y |
| --- | --- |
| 0.00 | 19.08 |
| 0.30 | 19.06 |
| 0.61 | 19.01 |
| 0.91 | 18.93 |
| 1.20 | 18.81 |
| 1.46 | 18.64 |
| 1.70 | 18.44 |
| 1.91 | 18.23 |
| 2.11 | 18.01 |
| 2.29 | 17.77 |
| 2.42 | 17.52 |
| 2.53 | 17.26 |
| 2.60 | 17.09 |
| 2.66 | 16.92 |
| 2.73 | 16.75 |
| 2.84 | 16.50 |
| 2.90 | 16.33 |
| 2.96 | 16.15 |
| 3.00 | 15.98 |
| 3.04 | 15.80 |
| 3.07 | 15.62 |
| 3.10 | 15.44 |
| 3.13 | 15.26 |
| 3.17 | 14.99 |
| 3.19 | 14.81 |
| 3.20 | 14.63 |
| 3.20 | 13.99 |
| 3.23 | 13.76 |
| 3.29 | 13.53 |
| 3.37 | 13.29 |
| 3.45 | 13.12 |
| 3.54 | 12.94 |
| 3.70 | 12.68 |
| 3.86 | 12.45 |
| 4.05 | 12.24 |
| 4.28 | 12.06 |

TABLE 2-continued

| X | Y |
|---|---|
| 4.66 | 11.84 |
| 4.86 | 11.72 |

Example 3

A gear wheel having a number of teeth equal to nine has a nominal tooth profile corresponding to a cubic natural spline function (which may be replaced by another spline function or smoothing spline if required) interpolating a plurality of nodal points defined by a pair of values {X,Y} expressed in a system of Cartesian coordinates having origin (O) in the center of the pitch circle P of the gear wheel. The coordinates of the nodal points of the left portion of a gear tooth are listed in the following table 3. The coordinates of the right portion are the same but in reverse order since the silhouette of the right portion—the remaining half of the tooth—is identically symmetrical to the silhouette of the given left portion of the tooth.

TABLE 3

| X | Y |
|---|---|
| −4.47 | 12.27 |
| −4.34 | 12.33 |
| −4.09 | 12.47 |
| −3.85 | 12.62 |
| −3.64 | 12.79 |
| −3.45 | 12.98 |
| −3.19 | 13.37 |
| −3.03 | 13.77 |
| −2.98 | 13.96 |
| −2.95 | 14.14 |
| −2.91 | 14.38 |
| −2.89 | 14.57 |
| −2.89 | 14.76 |
| −2.88 | 15.08 |
| −2.86 | 15.26 |
| −2.85 | 15.44 |
| −2.83 | 15.62 |
| −2.80 | 15.80 |
| −2.77 | 15.98 |
| −2.73 | 16.16 |
| −2.68 | 16.34 |
| −2.62 | 16.51 |
| −2.55 | 16.68 |
| −2.48 | 16.85 |
| −2.41 | 17.02 |
| −2.34 | 17.19 |
| −2.28 | 17.36 |
| −2.21 | 17.53 |
| −2.13 | 17.70 |
| −1.97 | 18.01 |
| −1.82 | 18.22 |
| −1.64 | 18.41 |
| −1.44 | 18.58 |
| −1.22 | 18.73 |
| −1.00 | 18.86 |
| −0.77 | 18.97 |
| −0.52 | 19.05 |
| −0.26 | 19.06 |
| 0.00 | 19.08 |

Example 4

A gear wheel having a number of teeth equal to ten has a nominal tooth profile corresponding to a cubic natural spline function (which may be replaced by another spline function or smoothing spline if required) interpolating a plurality of nodal points defined by a pair of values {X,Y} expressed in a system of Cartesian coordinates having origin (O) in the center of the pitch circle P of the gear wheel. The coordinates of the nodal points of the left portion of a gear tooth are listed in the following table 4. The coordinates of the right portion are the same but in reverse order since the silhouette of the right portion—the remaining half of the tooth—is identically symmetrical to the silhouette of the given left portion of the tooth.

TABLE 4

| X | Y |
|---|---|
| −4.16 | 12.80 |
| −4.02 | 12.86 |
| −3.89 | 12.92 |
| −3.70 | 13.03 |
| −3.52 | 13.15 |
| −3.41 | 13.24 |
| −3.25 | 13.38 |
| −3.12 | 13.53 |
| −3.01 | 13.68 |
| −2.92 | 13.83 |
| −2.84 | 14.03 |
| −2.75 | 14.33 |
| −2.73 | 14.44 |
| −2.70 | 14.65 |
| −2.69 | 14.75 |
| −2.68 | 14.96 |
| −2.67 | 15.19 |
| −2.65 | 15.37 |
| −2.61 | 15.63 |
| −2.56 | 15.89 |
| −2.52 | 16.15 |
| −2.46 | 16.41 |
| −2.39 | 16.66 |
| −2.30 | 16.92 |
| −2.20 | 17.16 |
| −2.09 | 17.40 |
| −1.97 | 17.64 |
| −1.86 | 17.88 |
| −1.79 | 18.02 |
| −1.67 | 18.22 |
| −1.54 | 18.41 |
| −1.38 | 18.57 |
| −1.19 | 18.72 |
| −0.99 | 18.83 |
| −0.78 | 18.93 |
| −0.56 | 19.00 |
| −0.34 | 19.06 |
| −0.12 | 19.07 |
| 0.00 | 19.08 |

Once the pitch between meshing gear wheels of a positive displacement pump, or one of the characteristic circles of the wheels, for example pitch circle or head diameter, are known or set, it is possible to obtain the values of coordinates {X,Y} starting from the pairs of values {X,Y} mentioned above by using simple conversion calculations. This allows obtaining values representing the points of the profiles of the actual teeth of the gear wheels which may be used for a cutting machine of gear wheels of known types, in particular for controlling the trajectory of a tool of a numerical control machine.

The production (and design) tolerance of the gear wheels must be such that to guarantee that the profile of the cut teeth is comprised in the band of tolerance as defined above.

Obviously, without prejudice to the principle of the invention, the construction details and the embodiments may widely vary with respect to what has been described and illustrated purely by way of example, without departing from the scope of protection of the present invention.

The invention claimed is:

1. A geared hydraulic apparatus comprising a pair of meshing gear wheels being mounted reciprocally rotatable in a casing, each of said pair of meshing gear wheels comprises:
eight helical teeth, each helical tooth of each gear wheel of the pair of meshing gear wheels having a cross-section tooth profile,
wherein:
said cross-section tooth profile is disposed on a plane perpendicular to a rotation axis of each gear wheel of the pair of meshing gear wheels and having a symmetrical profile about a radial plane passing through the zenith of each helical tooth,
said cross-section tooth profile falls within a band of tolerance delimited by a top profile and a bottom profile, said top profile and said bottom profile being equally distant of a fixed value from a nominal tooth profile lying in the center of the band of tolerance,
said nominal tooth profile is defined by a cubic natural spline function passing very near said plurality of nodal points, the cubic natural spline function interpolating a plurality of nodal points having pre-established coordinates {X,Y} expressed in a system of Cartesian coordinates having the origin at a center of each gear wheel of the pair of meshing gear wheels,
said fixed value from the nominal tooth profile which delimits the distance from the central line of said band of tolerance is equal to ±1/15 of the depth of the nominal tooth profile obtained with the cubic natural spline function, and
said pre-established coordinates {X,Y} represent nodal points of the plurality of nodal points which are arranged in said right portion of said symmetrical profile of each cross-section tooth profile of each helical tooth of each gear wheel having eight helical teeth of the pair of meshing gear wheels,
wherein said pre-established coordinates {X,Y} are arranged in said right portion of said symmetrical profile of each cross-section tooth profile according to the listing in Table 2 as follows:

TABLE 2

| X | Y |
|---|---|
| 0.00 | 19.08 |
| 0.30 | 19.06 |
| 0.61 | 19.01 |
| 0.91 | 18.93 |
| 1.20 | 18.81 |
| 1.46 | 18.64 |
| 1.70 | 18.44 |
| 1.91 | 18.23 |
| 2.11 | 18.01 |
| 2.29 | 17.77 |
| 2.42 | 17.52 |
| 2.53 | 17.26 |
| 2.60 | 17.09 |
| 2.66 | 16.92 |
| 2.73 | 16.75 |
| 2.84 | 16.50 |
| 2.90 | 16.33 |

TABLE 2-continued

| X | Y |
|---|---|
| 2.96 | 16.15 |
| 3.00 | 15.98 |
| 3.04 | 15.80 |
| 3.07 | 15.62 |
| 3.10 | 15.44 |
| 3.13 | 15.26 |
| 3.17 | 14.99 |
| 3.19 | 14.81 |
| 3.20 | 14.63 |
| 3.20 | 13.99 |
| 3.23 | 13.76 |
| 3.29 | 13.53 |
| 3.37 | 13.29 |
| 3.45 | 13.12 |
| 3.54 | 12.94 |
| 3.70 | 12.68 |
| 3.86 | 12.45 |
| 4.05 | 12.24 |
| 4.28 | 12.06 |
| 4.66 | 11.84 |
| 4.86 | 11.72. |

2. The geared hydraulic apparatus according to claim 1, wherein the hydraulic apparatus is a hydraulic pump.

3. The geared hydraulic apparatus according to claim 1, wherein the hydraulic apparatus is a hydraulic motor.

4. The geared hydraulic apparatus according to claim 1, wherein said cubic natural spline function is continuous and smooth.

5. The geared hydraulic apparatus according to claim 1, wherein each gear wheel, when meshing with a mating gear wheel, has a transverse contact ratio comprised between 0.4 and 1.2.

6. The geared hydraulic apparatus according to claim 5, wherein said transverse contact ratio is comprised between 0.7 and 1.1.

7. The geared hydraulic apparatus according to claim 5, wherein said transverse contact ratio is comprised between 0.9 and 1.

8. The geared hydraulic apparatus according to claim 5, wherein said transverse contact ratio is equal to one.

9. The geared hydraulic apparatus according to claim 1, wherein each gear wheel has a ratio between dimensions of face width and pitch circle comprised between 0.5 and 2.

10. The geared hydraulic apparatus according to claim 1, wherein the ratio between dimensions of face width and pitch circle is comprised between 0.7 and 1.25.

11. The geared hydraulic apparatus according to claim 1, wherein the ratio between dimensions of face width and pitch circle is equal to one.

12. The geared hydraulic apparatus according to claim 1, wherein the band of tolerance is of ±1/20 of the depth of the nominal tooth profile obtained with the cubic natural spline function.

13. The geared hydraulic apparatus according to claim 1, wherein the band of tolerance is of ±1/30 of the depth of the nominal tooth profile obtained with the cubic natural spline function.

* * * * *